(12) United States Patent
Jensen et al.

(10) Patent No.: US 9,056,677 B1
(45) Date of Patent: Jun. 16, 2015

(54) CURVATURE SENSING

(71) Applicant: Google Inc., Mountain View, CA (US)

(72) Inventors: Kenneth Jensen, Berkeley, CA (US);
Damon Vander Lind, Alameda, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/134,781

(22) Filed: Dec. 19, 2013

(51) Int. Cl.
*G05D 1/08* (2006.01)
*G05D 1/06* (2006.01)
*G05D 1/10* (2006.01)
*B64C 31/06* (2006.01)

(52) U.S. Cl.
CPC ..................... *B64C 31/06* (2013.01)

(58) Field of Classification Search
USPC .......... 701/3–4, 14–16, 6; 340/963, 967, 971, 340/973–975; 244/1 R, 75.1, 158.1–158.2, 244/164, 171
See application file for complete search history.

(56) References Cited

U.S. PATENT DOCUMENTS

| | | | |
|---|---|---|---|
| 7,775,483 | B2 | 8/2010 | Olson |
| 2010/0032948 | A1 | 2/2010 | Bevirt |
| 2010/0232988 | A1 | 9/2010 | Creighton et al. |
| 2010/0295303 | A1* | 11/2010 | Lind et al. ........................ 290/44 |
| 2010/0308174 | A1* | 12/2010 | Calverley .................. 244/155 A |
| 2011/0121570 | A1* | 5/2011 | Bevirt et al. .................... 290/44 |
| 2011/0266809 | A1 | 11/2011 | Calverley |

FOREIGN PATENT DOCUMENTS

| | | |
|---|---|---|
| WO | 2007/129341 | 11/2007 |
| WO | 2010/134997 | 11/2010 |
| WO | 2010/148373 | 12/2010 |
| WO | 2013026746 A1 | 2/2013 |
| WO | 2013/085800 | 6/2013 |

OTHER PUBLICATIONS

International Searching Authority, International Search Report and Written Opinion for International Application No. PCT/US2014/068139, mailed Mar. 17, 2015.

* cited by examiner

*Primary Examiner* — Yonel Beaulieu
(74) *Attorney, Agent, or Firm* — McDonnell Boehnen Hulbert & Berghoff LLP

(57) ABSTRACT

A system may include a tether connected to a ground station. The tether may include at least two bridle segments. The system may further include an aerial vehicle connected to the at least two bridle segments. The system may also include at least one sensor and a control system. The control system may be configured to: a) receive sensor data from the at least one sensor; and b) determine a tether roll angle based on the sensor data. The tether roll angle may represent an angle between the tether and an axis of the aerial vehicle. Optionally, the control system may also be configured to determine a curvature of a path of the aerial vehicle based on the tether roll angle. The control system may additionally be configured to control at least one control surface of the aerial vehicle based on the curvature of the path.

20 Claims, 5 Drawing Sheets

CURVATURE SENSING

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

The present disclosure generally relates to systems and methods that incorporate a ground station for tethering aerial vehicles such as those employed in crosswind aerial vehicle systems. Crosswind aerial vehicle systems may extract useful power from the wind for various purposes such as, for example, generating electricity, lifting or towing objects or vehicles, etc. Efficiently flying the aerial vehicles to generate power may present difficulties due to, for example, changing wind conditions and/or turbulent wind conditions. Beneficially, embodiments described herein may allow for more reliable, safe, and efficient use of aerial vehicles.

Methods and systems for determining a tether roll angle of an aerial vehicle, determining a curvature of a flight path of the aerial vehicle based on the tether roll angle, and controlling the flight path of the aerial vehicle are described herein. In some embodiments, sensors, such as load cells, may provide sensor data about forces distributed between several bridle segments making up a bridle. Based on sensor data, any or all of tether roll angle and curvature of the flight path may be determined. Beneficially, embodiments described herein may provide more robust methods for controlling an aerial vehicle based, at least in part, on one or more of a determined tether roll angle and flight path curvature.

In a first aspect, a system is provided. The system may include a tether coupled to a ground station. The tether may include at least two bridle segments. The system may further include an aerial vehicle coupled to the at least two bridle segments and at least one sensor coupled to the tether. The system may also include a control system configured to receive sensor data from the at least one sensor. The control system may also determine a tether roll angle based on the sensor data. The tether roll angle may be an angle between the tether and an axis of the aerial vehicle.

In a second aspect, a method is provided. The method may include receiving sensor data from at least one sensor coupled to a tether. The method may further include determining, based on the sensor data, a tether roll angle. The tether roll angle may be an angle between the tether and an axis of an aerial vehicle. The tether may include at least two bridle segments. The at least two bridle segments may be coupled to the aerial vehicle.

In a third aspect, a non-transitory computer readable medium is provided. The non-transitory computer readable medium may include stored instructions executable by a computing device to cause the computing device to perform various functions. The functions may include receiving sensor data from at least one sensor coupled to a tether and determining, based on the sensor data, a tether roll angle. The tether roll angle may be an angle between the tether and an axis of the aerial vehicle. The tether may include at least two bridle segments. The at least two bridle segments may be coupled to the aerial vehicle.

In further aspects, many types of devices may be used or configured as a means for performing functions of any of the methods described herein (or any portions of the methods described herein). For example, aerial vehicles contemplated herein may include, but should not be limited to, powered and unpowered kites, airplanes, airfoils, flying wings, helicopters, or any other tethered airborne object or vehicle. Further, the control system contemplated herein may include, but is not limited to, one or more computing devices that could be located at one or more locations. Such locations may include onboard the aerial vehicle, at the ground station, at one or more other locations, or any combination of these.

These as well as other aspects, advantages, and alternatives, will become apparent to those of ordinary skill in the art by reading the following detailed description, with reference where appropriate to the accompanying drawings.

DETAILED DESCRIPTION

Figure 1:
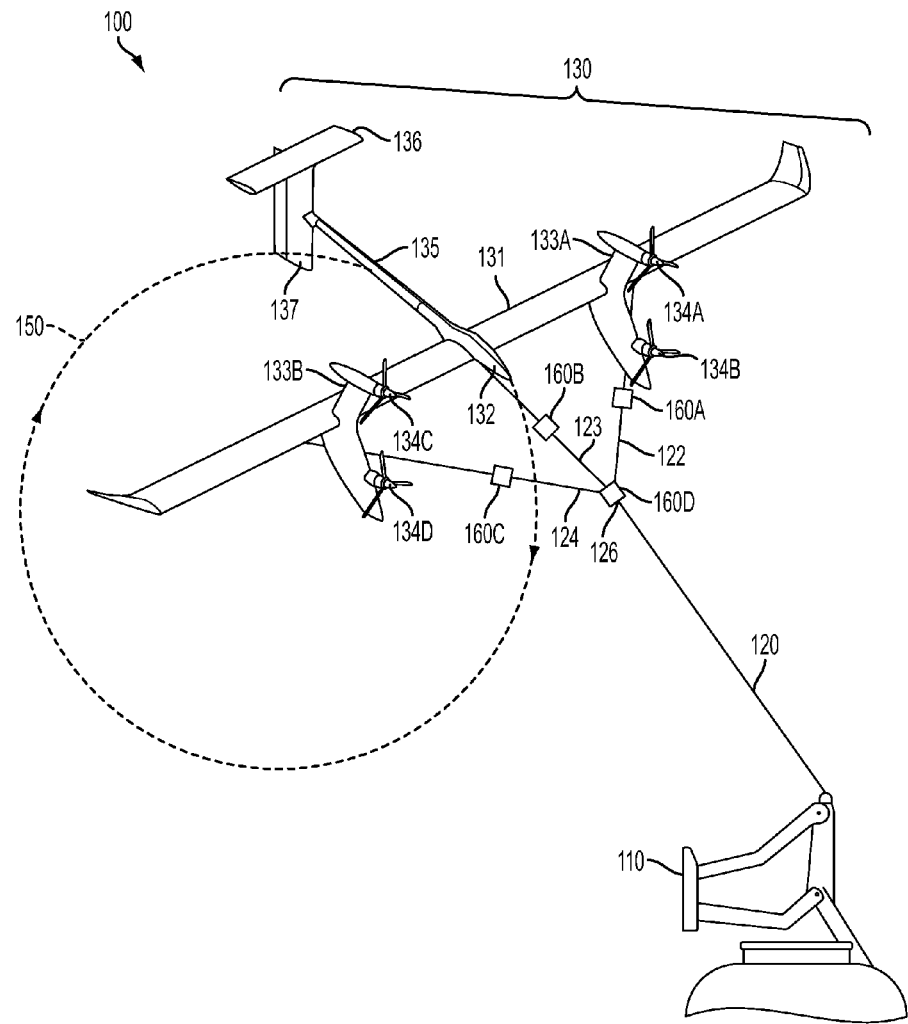
FIG. 1 depicts an Airborne Wind Turbine (AWT), according to an illustrative embodiment.

Illustrative methods and systems are described herein. The illustrative embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

I. OVERVIEW

In an Airborne Wind Turbine (AWT) system, an aerial vehicle may convert kinetic wind energy to electrical energy. The aerial vehicle may be connected to a ground station via a tether so that the aerial vehicle can take off from the ground station, fly at a range of elevations (for example, in an approximately circular path), conduct electrical current to the ground station, and land at the ground station. In some examples, the ground station may provide electrical current to the aerial vehicle via the tether for take-off and/or landing. The tether may also be configured to transmit other kinds of signals.

In an AWT, an aerial vehicle may rest in and/or on a ground station (or perch) when the wind is not conducive to power generation. When the wind is conducive to power generation, such as when a wind speed may be 3.5 meters per second (m/s) at an altitude of 200 meters (m), the ground station may deploy (or launch) the aerial vehicle. In addition, when the aerial vehicle is deployed and the wind is not conducive to power generation, the aerial vehicle may return to the ground station.

Moreover, in an AWT, an aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle may ascend to a location for crosswind flight based at least in part on hover flight. Further, the aerial vehicle may take-off and/or land via hover flight.

In hover flight, a span of a main wing of the aerial vehicle may be oriented substantially parallel to the ground, and one or more propellers of the aerial vehicle may cause the aerial vehicle to hover over the ground. In some implementations, the aerial vehicle may vertically ascend or descend in hover flight.

In crosswind flight, the aerial vehicle may be propelled by the wind substantially along a path, which as noted above, may convert kinetic wind energy to electrical energy. In some implementations, the one or more propellers of the aerial vehicle may generate electrical energy by slowing down the incident wind.

Illustrative embodiments may generally relate to methods and devices operable to: a) determine a tether roll angle of an aerial vehicle; b) based on the tether roll angle, determine the curvature of the flight path of the aerial vehicle; and c) control the aerial vehicle's flight path. For example, the tether portion near the aerial vehicle may include a bridle. The bridle may include at least two bridle segments that each connect to the aerial vehicle. The bridle segments may each include sensors, such as load cells, operable to measure the tensile force along each bridle segment. The data from such sensors may be used to determine information about the aerial vehicle. For example, the sensor data may provide information about the angle of the tether relative to an axis of the aerial vehicle. Since the flight path of the aerial vehicle is related to the angle of the tether, such sensor data may be used to control the aerial vehicle. In other words, sensors located in the bridle segments or elsewhere may provide data for determining the tether roll angle, which may, in turn, be used to control the curvature of the aerial vehicle's flight path. Beneficially, the illustrative embodiments herein may provide systems and methods to control an aerial vehicle to fly along a predetermined path.

II. ILLUSTRATIVE SYSTEMS

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the aerial vehicle 130 may be coupled to the tether 120, and the tether 120 may be coupled to the ground station 110. In this example, the tether 120 may be attached to the ground station 110 at one location on the ground station 110, and attached to the aerial vehicle 130 at three locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in flight.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length may be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The tether 120 may include two or more bridle segments 122, 123, and 124. While FIG. 1 depicts three bridle segments 122, 123, and 124, more or less bridle segments are possible. The bridle segments 122, 123, and 124 may be coupled to various locations on the aerial vehicle 130. Furthermore, the bridle segments 122, 123, and 124 may connect to one another at a bridle attachment point 126. While FIG. 1 depicts one bridle attachment point 126, some embodiments may include more than one bridle attachment point. Alternatively, embodiments need not include a bridle attachment point.

The bridle segments 122, 123, and 124 may provide physical restraint and/or support for the aerial vehicle 130. In a preferred embodiment, bridle segment 122 may be coupled to the port side portion of the main wing 131 and outboard of rotor connector 133A. In such an embodiment, bridle segment 124 may be coupled to the starboard side portion of main wing 131 and outboard of rotor connector 133B. Additionally, bridle segment 123 may be coupled to the front section 132. Other physical arrangements of the bridle segments are possible.

One or more of the bridle segments 122, 123, and 124 may additionally provide an electrical pathway between, for instance, the aerial vehicle 130 and the ground station 110. As such, the bridle segments 122, 123, and 124 may be configured to conduct various electrical signals, such as the power generated by the aerial vehicle 130 or various communications or sensor data from the aerial vehicle 130. Other electrical signals may be facilitated between the aerial vehicle 130 and the ground station 110 via the bridle segments 122, 123, and 124.

Sensors 160A-D may be coupled to one or more of the bridle segments 122, 123, and 124. The sensors 160A-D may be configured to determine the tension on the respective bridle segment(s) to which the sensors 160A-D may be coupled. For example, load cells may be coupled to bridle segment 122 and bridle segment 124. Other types of sensors configured to measure tension of the bridle segment 122 and 124 are possible.

Other mounting positions are possible for sensors 160A-D. For example, sensors 160A-D may be located in-line with the bridle segments or may be located on the aerial vehicle 130. Further, the one or more sensors may be coupled to brackets on the main wing 131 that couple to the bridle segments 122, 123, and 124. In some embodiments, sensors 160A-D need not be coupled to one or more of the bridle segments, such as bridle segment 123. Additionally, although four sensors are shown in FIG. 1, more or fewer sensors are possible.

Alternatively, sensors 160A-D may be coupled to the bridle attachment point 126. For example, sensor 160D, located at or near the bridle attachment point 126, may be configured to provide sensor data regarding the angle of the tether 120 with respect to the bridle segments 122, 123, and 124 and/or the aerial vehicle 130.

The aerial vehicle 130 may be configured to fly substantially along a path 150 to generate electrical energy. The path 150 may be substantially circular and/or curved. Thus, the path 150 may have a curvature. The term "substantially along," as used in this disclosure, refers to exactly along and/or one or more deviations from exactly along that do not significantly impact generation of electrical energy as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of the numeral 8 ("a figure-eight"), etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, ailerons, rudders, elevators, etc. The control surfaces may be used to stabilize the aerial vehicle 130 and/or reduce drag on the aerial vehicle 130 during flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may be configured to drive one or more generators for the purpose of generating electrical energy. In this example, the rotors 134A-D may each include one or more blades, such as three blades. The one or more rotor blades may rotate via interactions with the wind and which may be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 meters. Moreover, in some implementations, the tail boom 135 may take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein may involve any suitable aerial vehicle that is connected to a tether, such as the tether 120.

B. Illustrative Components of an AWT

Figure 2:
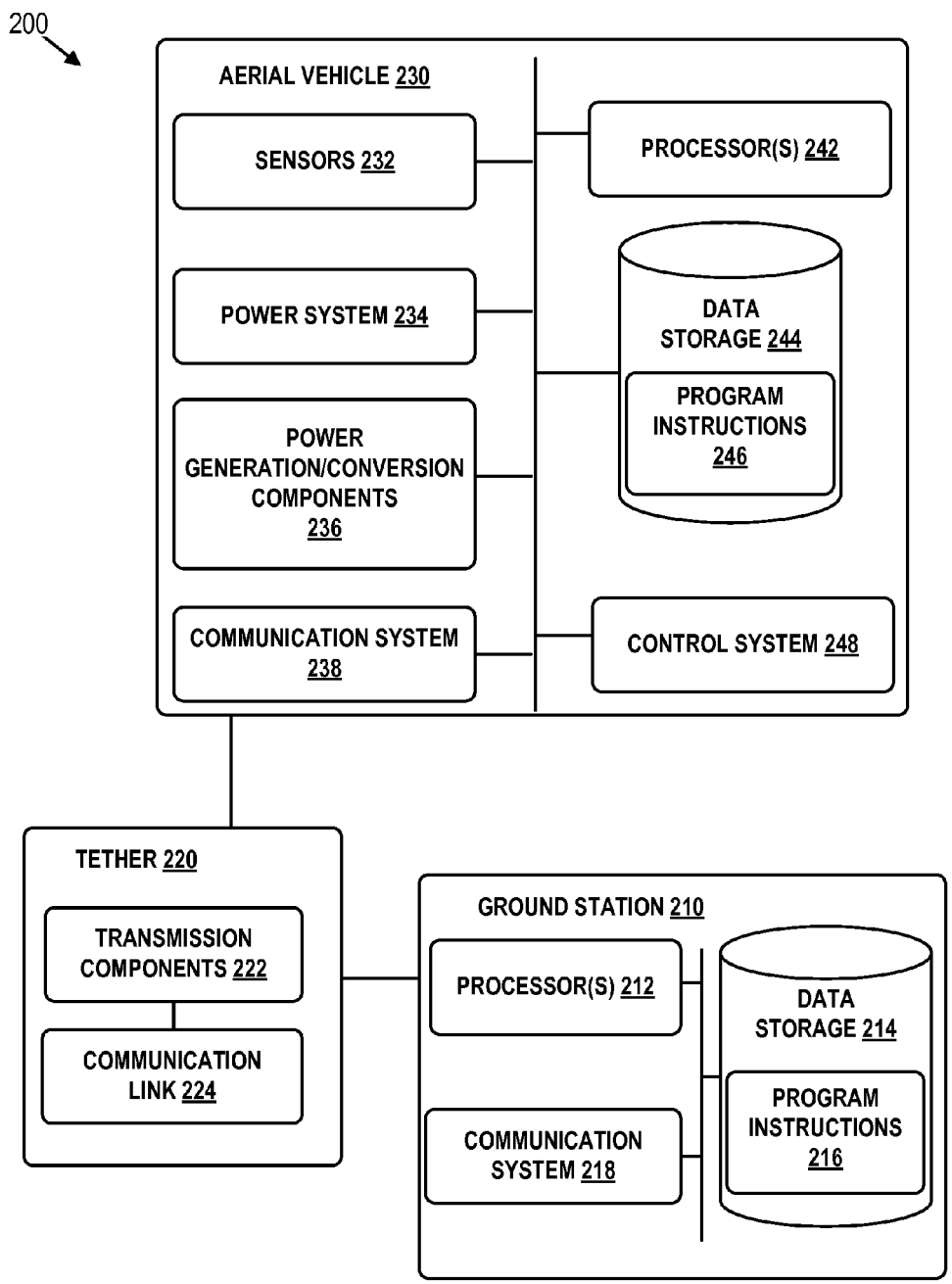
FIG. 2 is a simplified block diagram illustrating components of an AWT, according to an illustrative embodiment.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special-purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by the at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wired interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Wired interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which allows for the conduction of electric current. Moreover, in some implementations, the transmission components 222 may surround a core of the tether 220.

The ground station 210 may communicate with the aerial vehicle 230 via the communication link 224. The communication link 224 may be bidirectional and may include one or more wired and/or wireless interfaces. Also, there may be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, program instructions 246, and a control system 248.

The sensors 232 may include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a Nano-ElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

The sensors 232 may also include sensors configured to provide various data that may be used to determine a tether roll angle. Sensors 232 may include various types of tension sensors (e.g., metal-foil strain gauge, fiber optic load cells, or fiber Bragg grating strain gauge).

For example, tension sensors may be coupled to the bridle segments of the tether 220. Data from such tension sensors, which may relate to the distribution of forces in various bridle segments, may be useful to determine the tether roll angle. Other sensor types are possible, such as encoders (e.g., rotary/shaft encoders, angle encoders, optical-type encoders). Such encoders may operate using optical sensing, magnetic sensing, or any other known way to sense a relative position or angle. In an illustrative embodiment, a magnetic encoder may be coupled to the tether. The magnetic encoder may directly or indirectly measure the tether roll angle.

As noted, the aerial vehicle 230 may include the power system 234. The power system 234 may take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel may be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 may take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein may involve any suitable aerial vehicle that is connected to a tether, such as the tether 230 and/or the tether 110.

Figure 3:
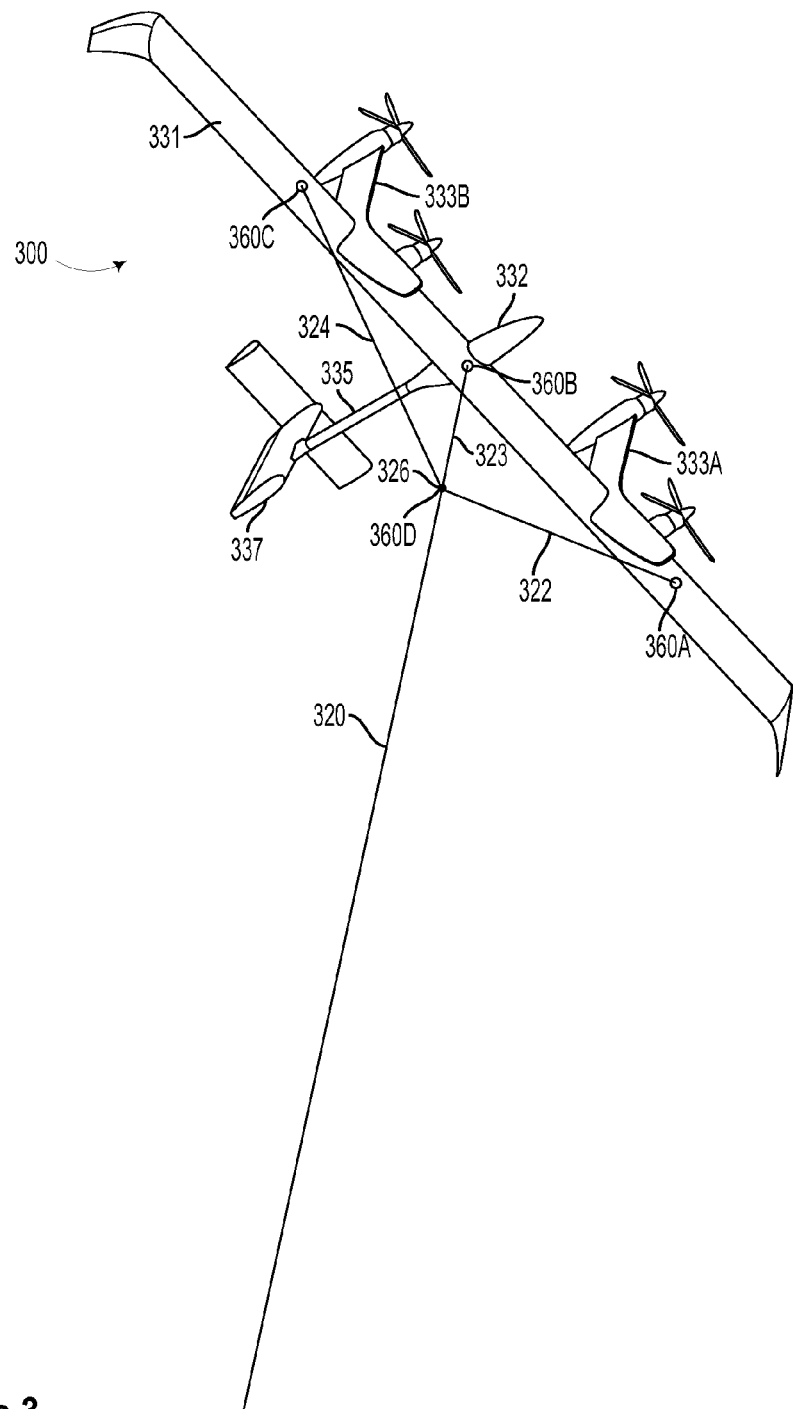
FIG. 3 depicts an underside, oblique view of an AWT, according to an illustrative embodiment.

FIG. 3 depicts an underside, oblique view of an AWT 300. AWT 300 may be identical or similar in form to AWT 100 as shown and described in FIG. 1. As shown, the AWT 300 may be connected to a ground station (not shown) via a tether 320. The tether 320 may further include a bridle, which may include bridle segments 322, 323, and 324. The bridle segments 322, 323, and 324 may connect to one another at a bridle connection point 326. Further, the bridle segments 322, 323, and 324 may be coupled to the main wing 331 or another location of the AWT 300. For example, the one or more bridle segments may attach to the nose section 332, the tail boom 335, the tail 337, or any other location on the fuselage of the AWT 300.

In some embodiments, the bridle segment 322 may be coupled to the main wing 331 at a location outboard of the port rotor connector 333A. Furthermore, bridle segment 324 may be coupled to the main wing 331 at a location outboard of the starboard rotor connector 333B. Bridle segment 323 may be coupled to the main wing 331 at a location substantially along the centerline of the underside of aerial vehicle 300. The bridle segments 322, 323, and 324 may be arranged such that they are collinear along the main axis of the main wing. Other bridle segment coupling arrangements are possible. For example, the bridle segments 322, 323, and 324 need not be arranged in a collinear fashion along the main axis of the main wing.

AWT 300 may include one or more sensors 360A-D. Although sensors 360A-C are shown at or near the locations where the bridle segments 322, 323, and 324 attach to the main wing 331, other locations are possible. For example, sensor 360D could be located at or near the bridle attachment point 326. Furthermore, although four sensors are shown in FIG. 3, more or fewer sensors are possible.

Figure 4:
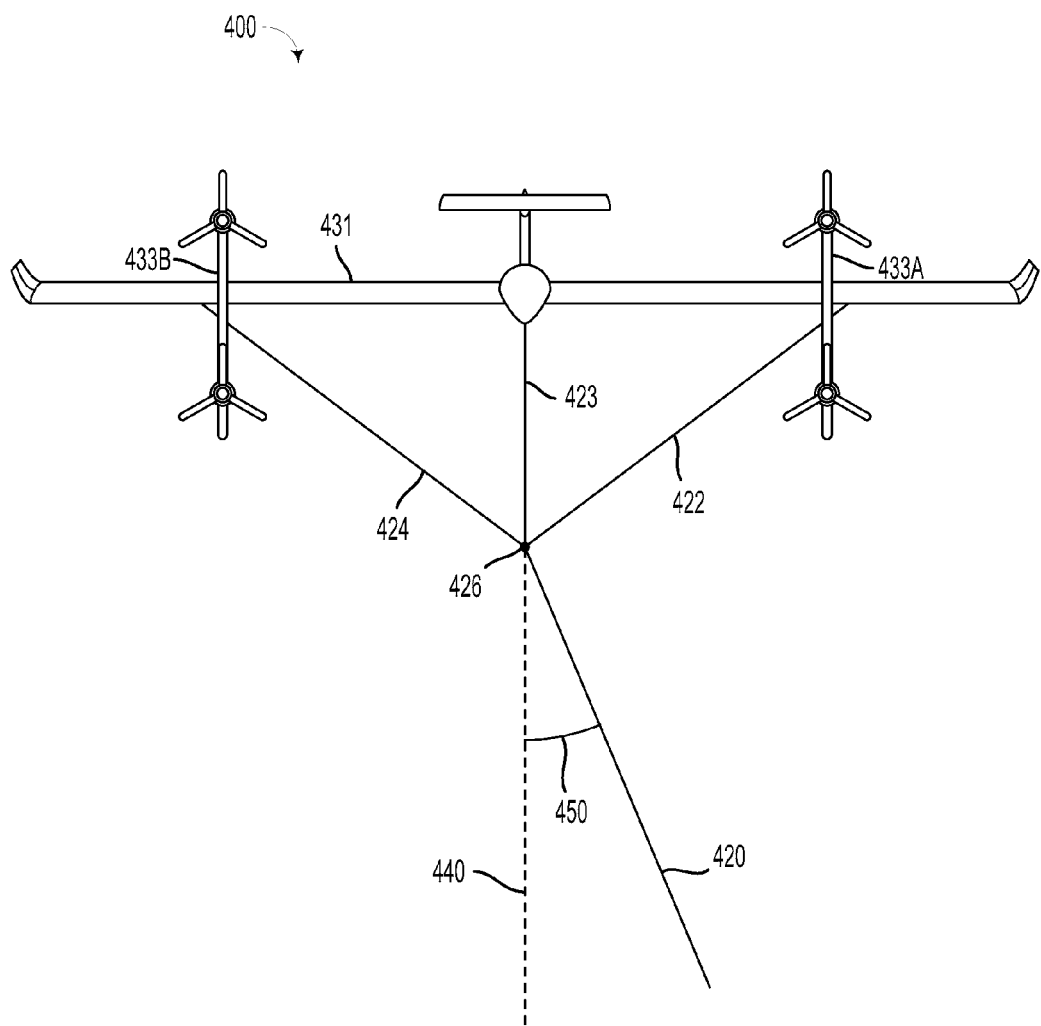
FIG. 4 depicts a front view of an AWT, according to an illustrative embodiment.

FIG. 4 depicts a front view of an AWT 400. AWT 400 may be identical or similar to AWT 300 and AWT 100 as shown and described in FIGS. 1 and 3. AWT 400 may be coupled to a ground station (not shown) via a tether 420. Tether 420 may include bridle segments 422, 423, and 424. Bridle segments 422 and 424 may be coupled to the underside of main wing 431 at locations outboard of rotor connectors 433A and 433B, respectively. The bridle segments 422, 423, and 424 may be coupled at bridle attachment point 426.

In an illustrative embodiment, a central axis 440 may be defined as passing through the center of AWT 400 perpendicular to the main surface of main wing 431. A tether roll angle 450 may be defined by an angle between the tether 420 and the central axis 440.

Alternatively or additionally, the tether roll angle may be defined with respect to a plane formed by the bridle segments 422, 423, and 424. Such a bridle plane may pivot relative to the axes of the AWT 400. In other words, the tether roll angle may include an axis of the AWT 400 projected into the plane of the bridle segments 422, 423, and 424.

Further, at least one sensor may be coupled to any of, but is not limited to coupling to only: the main wing 431, bridle segments 422, 423, and 424, the bridle attachment point 426. One or more sensors may provide sensor data to a control system 248, as described in reference to FIG. 2. The control system 248 may receive the sensor data from the one or more sensors and may determine a tether roll angle based on the sensor data. The one or more sensors may be similar or identical to sensors 232, sensors 160A-D, and/or sensors 360A-D, as described in reference to FIGS. 1-3.

III. ILLUSTRATIVE METHODS

Figure 5:
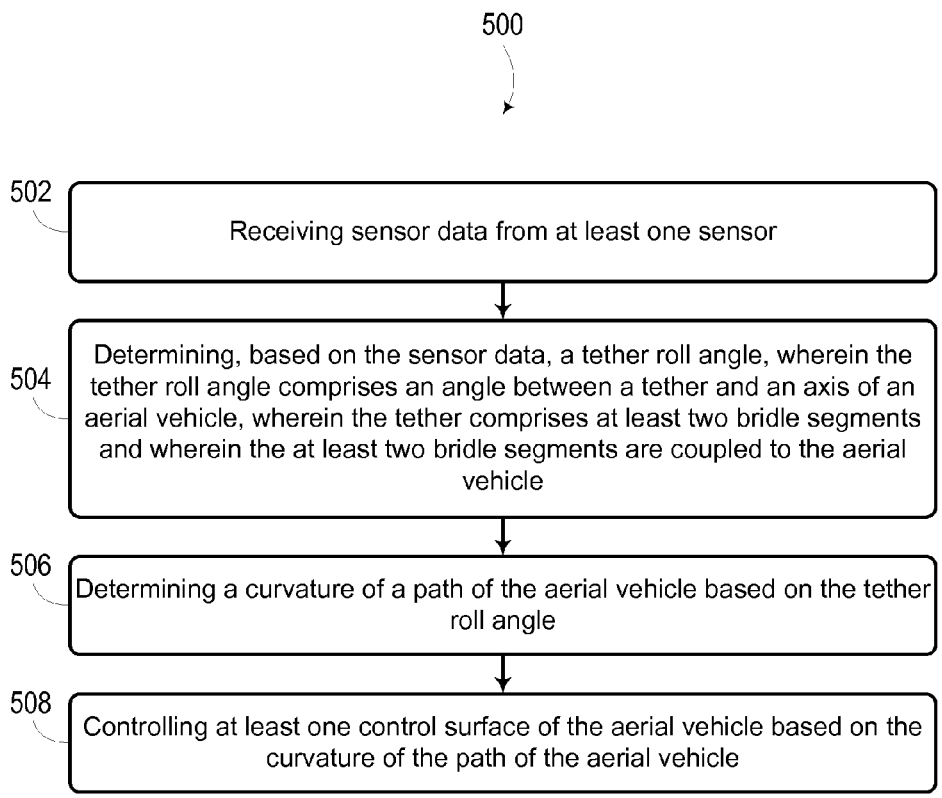
FIG. 5 is a simplified block diagram illustrating a method, according to an illustrative embodiment.

FIG. 5 is a simplified block diagram illustrating a method 500, according to an example embodiment. The method 500 may be used to determine a tether roll angle of an aerial vehicle. Illustrative methods, such as method 500 may be carried out in whole or in part by a component or components of an aerial vehicle, such as by the one or more components of the aerial vehicles shown in and described in reference to FIGS. 1-4. For example, method 500 may be performed by the control system 248. It should be understood that illustrative methods, such as method 500, may be carried out by other entities or combination of entities without departing from the scope of the disclosure.

As shown by block 502, method 500 includes receiving sensor data from at least one sensor. At block 502, the at least one sensor may be similar in type and/or position to sensors 232 as described in reference to FIG. 2. Receiving the sensor data from the at least one sensor may be performed in a wired or wireless fashion, for instance by utilizing communication system 238, communication system 218, and/or communication link 224 as described in reference to FIG. 2.

In an illustrative embodiment, the sensor data may be received continuously and/or upon prompting (e.g., in response to an interrupt request or other signal from the control system 248). In an illustrative embodiment, the sensor data may be received at a data rate of 250 Hz. Alternatively, the sensor data may be received at data rates higher or lower than 250 Hz.

As shown by block 504, method 500 also includes determining, based on the sensor data, a tether roll angle. The tether roll angle may include an angle between a tether and an axis of an aerial vehicle. The tether may include at least two bridle segments and the at least two bridle segments may be coupled to the aerial vehicle. At block 504, the tether roll angle may be similar or identical to the tether roll angle 450 as shown and described in reference to FIG. 4.

At block 504, tether roll angle may be determined directly or indirectly by, for instance, utilizing received sensor data from load cells along the bridle segments or on the main wing. The control system may calculate the tether roll angle based on the balance of forces. Forces included in such a calculation may include the tether force, sideways lift force from the aerial vehicle, as well as the centrifugal force caused by the aerial vehicle accelerating in a circular path.

Alternatively, the tether roll angle may be determined based on a line angle sensor at or near the bridle attachment point where the bridle segments couple to one another. As a further alternative, the tether roll angle may be determined based on comparing sensor data from the respective load cells to known empirical data. Other direct and indirect methods of determining or calculating the tether roll angle are possible.

Optionally, the method 500 may include block 506, which includes determining a curvature of a path of the aerial vehicle based on the tether roll angle. Determining the curvature of the path of the aerial vehicle may be estimated using several methods.

In an example embodiment, the curvature may be estimated using known dynamics of the system. First, the geometric curvature equation may be utilized. For example, the geometric definition of curvature, $\kappa$, is: $\kappa = |\vec{a} \times \vec{v}|/|\vec{v}|^3$, where $\vec{a}$ is the acceleration of the wing and $\vec{v}$ is the inertial velocity of the wing. By assuming that the inertial velocity is approximately equal to the airspeed and that the roll angle of the wing relative to the plane of the flight path is small, curvature may be approximated by: $\kappa \approx \rho_{air} A/2m(C_L \sin\theta_T + C_Y)$, where $\rho_{air}$ is the density of air, A is the area of the wing, m is the wing mass, $C_L$ is the lift coefficient, $\theta_T$ is the tether roll angle, and $C_Y$ is the pylon lift coefficient. $C_Y$ can be estimated from the direct force measurements (sensor data) from Block 504 and an estimate of airspeed (e.g., from a pitot tube or a combination of an inertial speed sensor and wind sensor). Both $C_L$ and $C_Y$ may also be estimated from a measurement of the angle-of-attack and sideslip of the aerial vehicle and a knowledge of the aerial vehicle's aerodynamic characteristics. Thus, by finding the tether roll angle in Block 504, the curvature of the path of the aerial vehicle may be determined. Other methods of determining the curvature of the path of the aerial vehicle are possible.

Also optionally, the method 500 may include block 508, which includes controlling at least one control surface of the aerial vehicle based on the curvature of the path of the aerial vehicle. In an illustrative embodiment, the determined curvature of the path of the aerial vehicle from block 506 may be compared to a curvature setpoint and/or a predetermined path. For example, a proportional-integral-derivative (PID) controller or similar software-based control loop methods may be used to provide an error value based on, for example, a difference between a predetermined path and the determined curvature of the path of the aerial vehicle. The error value may be used to adjust one or more control surfaces of the aerial vehicle. The one or more control surfaces may include the elevator, rudder, ailerons, and/or the action of the propeller blades. The control surfaces may be adjusted so as to more closely match the determined curvature with the curvature setpoint and/or predetermined path.

IV. ILLUSTRATIVE NON-TRANSITORY COMPUTER READABLE MEDIA

Some or all of the functions described above and illustrated in FIG. 5 may be performed by a computing device in response to the execution of instructions stored in a non-transitory computer readable medium. The non-transitory computer readable medium may be, for example, a random access memory (RAM), a read-only memory (ROM), a flash memory, a cache memory, one or more magnetically encoded discs, one or more optically encoded discs, or any other form of non-transitory data storage. The non-transitory computer readable medium may also be distributed among multiple data storage elements, which may be remotely located from each other. The computing device that executes the stored instructions may include the control system 248 as described and illustrated in reference to FIG. 2. Additionally or alternatively, the computing device may include another computing device, such as a server in a server network.

The non-transitory computer readable medium may store instructions executable by a processor (e.g. processor 242 and/or processor 212 as described in reference to FIG. 2) to perform various functions. The functions include receiving sensor data from at least one sensor and determining, based on the sensor data, a tether roll angle. The tether roll angle may be an angle between a tether and an axis of an aerial vehicle. The tether may include at least two bridle segments, which may be coupled to the aerial vehicle.

Optionally, the functions may include determining a curvature of a path of the aerial vehicle based on the tether roll angle. Further, the functions may include controlling at least one control surface of the aerial vehicle based on the curvature of the path of the aerial vehicle.

V. CONCLUSION

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A system comprising:
   a tether coupled to a ground station, wherein the tether comprises at least two bridle segments;
   an aerial vehicle coupled to the at least two bridle segments;
   at least one sensor coupled to the tether; and
   a control system configured to:
   a) receive sensor data from the at least one sensor; and
   b) determine a tether roll angle based on the sensor data, wherein the tether roll angle comprises an angle between the tether and an axis of the aerial vehicle.

2. The system of claim 1 wherein the control system is further configured to determine a curvature of a path of the aerial vehicle based on the tether roll angle.

3. The system of claim 2, wherein the control system is further configured to control at least one control surface of the aerial vehicle based on the curvature of the path.

4. The system of claim 2, wherein the control system is further configured to transmit the curvature of the path to the ground station.

5. The system of claim 1, wherein the at least one sensor comprises at least one load cell.

6. The system of claim 1, wherein the at least one sensor comprises at least one encoder.

7. The system of claim 1, wherein the at least one sensor is coupled to at least one of the at least two bridle segments.

8. The method of claim 1 wherein the at least one sensor is coupled to a bridle attachment point, wherein the bridle attachment point comprises a location where the at least two bridle segments connect to the tether.

9. The system of claim 1, wherein the at least one sensor is coupled to the aerial vehicle.

10. A method comprising:
    receiving sensor data from at least one sensor coupled to a tether; and
    determining, based on the sensor data, a tether roll angle, wherein the tether roll angle comprises an angle between the tether and an axis of an aerial vehicle, wherein the tether comprises at least two bridle segments and wherein the at least two bridle segments are coupled to the aerial vehicle.

11. The method of claim 10 further comprising determining a curvature of a path of the aerial vehicle based on the tether roll angle.

12. The method of claim 11, further comprising controlling at least one control surface of the aerial vehicle based on the curvature of the path of the aerial vehicle.

13. The method of claim 10 wherein the at least one sensor is coupled to a bridle attachment point, wherein the bridle attachment point comprises a location where the at least two bridle segments connect to the tether.

14. The method of claim 10 wherein the at least one sensor is coupled to at least one of the at least two bridle segments.

15. The method of claim 10 wherein the at least one sensor comprises at least one load cell.

16. The method of claim 10 wherein the at least one sensor comprises at least one encoder.

17. The method of claim 10, further comprising transmitting the curvature of the path to a ground station.

18. The method of claim 10 wherein the axis of the aerial vehicle comprises an axis normal to a plane of, and substantially centered about, a main wing of the aerial vehicle.

19. A computer readable medium having stored therein instructions executable by a computing device to cause the computing device to perform functions comprising:
    receiving sensor data from at least one sensor coupled to a tether; and
    determining, based on the sensor data, a tether roll angle, wherein the tether roll angle comprises an angle between the tether and an axis of an aerial vehicle, wherein the tether comprises at least two bridle segments and wherein the at least two bridle segments are coupled to the aerial vehicle.

20. The computer readable medium of claim 19, further comprising determining a curvature of a path based on the tether roll angle.

* * * * *